(12) United States Patent
Davis

(10) Patent No.: US 7,843,355 B2
(45) Date of Patent: Nov. 30, 2010

(54) FLUID-GAUGING SYSTEMS

(75) Inventor: Andrew Ceri Davis, Cheltenham (GB)

(73) Assignee: Smiths Group PLC, London (GB)

( * ) Notice: Subject to any disclaimer, the term of this patent is extended or adjusted under 35 U.S.C. 154(b) by 638 days.

(21) Appl. No.: 11/392,608

(22) Filed: Mar. 30, 2006

(65) Prior Publication Data

US 2006/0220890 A1   Oct. 5, 2006

(30) Foreign Application Priority Data

Mar. 31, 2005   (GB) .................................. 0506466.2

(51) Int. Cl.
*G08B 21/00*   (2006.01)
(52) U.S. Cl. ...................................................... 340/612
(58) Field of Classification Search ................. 340/612, 340/691.1, 945, 815.4; 73/290 R, 304 R
See application file for complete search history.

(56) References Cited

U.S. PATENT DOCUMENTS

| | | | |
|---|---|---|---|
| 3,830,090 A * | 8/1974 | Hersch et al. ............. 73/304 C |
| 4,420,976 A | 12/1983 | Orloff et al. ................... 73/304 |
| 6,157,894 A * | 12/2000 | Hess et al. ..................... 702/54 |
| 6,332,358 B1 * | 12/2001 | Atkinson ................... 73/304 R |
| 6,502,042 B1 * | 12/2002 | Eid et al. ....................... 702/50 |
| 2005/0217367 A1 * | 10/2005 | Atkinson ................... 73/290 V |

FOREIGN PATENT DOCUMENTS

| | | |
|---|---|---|
| GB | 1486418 A | 9/1977 |
| GB | 2 376 073 A | 12/2002 |
| GB | 2 410 799 A | 8/2005 |
| WO | WO 02/35185 A2 | 5/2002 |

\* cited by examiner

*Primary Examiner*—Phung Nguyen
(74) *Attorney, Agent, or Firm*—William Scott Andes, Esq.; Armstrong Teasdale LLP

(57) ABSTRACT

An aircraft fuel-gauging system has multiple gauging sensors in each tank divided into two groups. Each group of sensors connects with a respective processor. The processors are linked to provide a display in the cockpit to give an indication of fuel quantity derived from all the sensors. The two processors also provide separate, nominally-identical display indications of fuel quantity on a refuel panel on the exterior of the aircraft. The refueller can compare these two separate quantity indications with the flow meter in the fuel dispenser to confirm that the correct quantity has been dispensed.

12 Claims, 1 Drawing Sheet

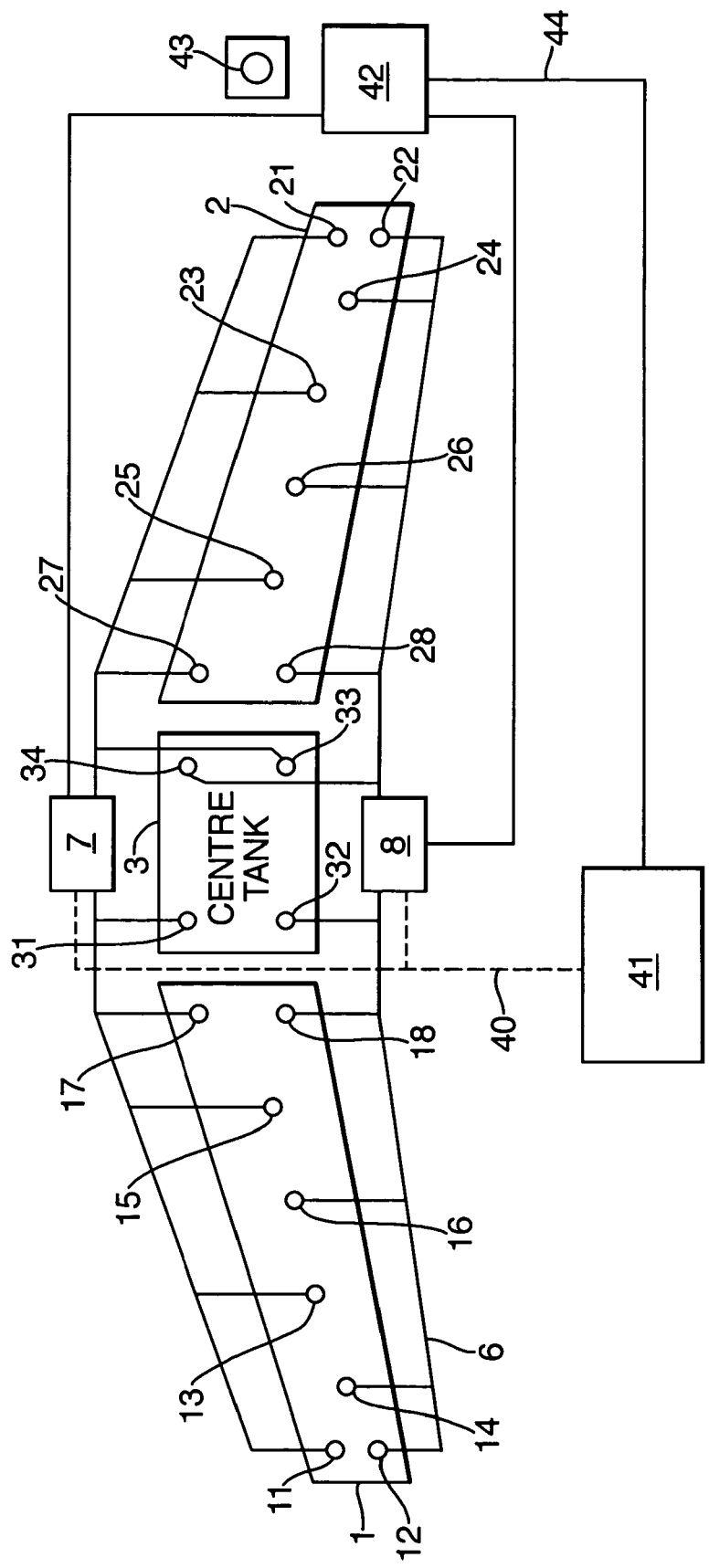

ially close to the refuelling port (not shown), which includes a display 43 of fuel quantity.

FLUID-GAUGING SYSTEMS

BACKGROUND OF THE INVENTION

This invention relates to fluid-gauging systems and methods.

The invention is more particularly, but not exclusively, concerned with aircraft fuel-gauging systems.

Aircraft include fuel-gauging systems to measure the quantity of fuel present in the fuel tanks. There are usually several fuel tanks, often located in the wings, each tank usually having several sensors or probes to measure the height of fuel present. With knowledge of the shape of the tank and the height of fuel at several different locations, the system can compute the volume of fuel in each tank. The number of probes needed depends on the pitch and roll angles likely to be experienced by the aircraft during flight. The gauging probes may be of the capacitive kind, where the capacitance of the probe varies with height of fuel. Alternatively, the probes may be of the ultrasonic kind, where the height is calculated from time for a pulse of acoustic energy to travel from an acoustic transducer at the bottom of the probe to the fuel surface and back to the transducer after reflection from the fuel surface. These systems can provide a highly accurate indication of fuel quantity over a wide range of aircraft attitudes during flight. The fuel-gauging system is also used on the ground during refuelling in order to check on the quantity of fuel dispensed to the aircraft. Aircraft often also include a secondary, back-up fuel-gauging system of a simpler, less accurate, mechanical kind. This is used to provide additional evidence of fuel quantity if there is disagreement between the primary fuel-gauging system and the flow meter in a fuel tanker dispensing fuel to the aircraft on the ground.

It is undesirable to have to provide a secondary gauging system because of the additional cost and weight of such systems, and the difficulty of fitting such a system to modern composite wings. It is possible to provide a secondary electronic gauging system but the cost of the additional sensors makes this prohibitive in most cases. The additional weight is also a severe disadvantage.

BRIEF SUMMARY OF THE PRESENT INVENTION

It is an object of the present invention to provide an alternative fluid-gauging system.

According to one aspect of the present invention there is provided a fluid-gauging system including a plurality of gauging sensors operable to provide an indication of the height of fluid at the location of the sensor, the system including processing means operable to provide a first indication of fluid quantity from a first group of sensors, and a second indication of fluid quantity from a second group of sensors different from said first group.

The system preferably includes a plurality of fluid tanks, each tank including a plurality of gauging sensors. The processing means preferably includes two processors separate from one another, one processor being arranged to provide the first indication of fluid quantity and the other processor being arranged to provide the second indication of fluid quantity. The two processors are preferably interconnected with one another in such a way that each can provide an indication separately or can provide a combined indication derived from substantially all the sensors. The system may be operable in two different modes in one of which the system provides an indication of fluid quantity from a reduced number of sensors and in the other of which it provides an indication from substantially all the sensors. The sensors may be capacitive or acoustic sensors. The system is preferably an aircraft fuel-gauging system in which the first and second indications of fuel quantity are provided to a display of fuel quantity visible on the exterior of the aircraft. The display of fuel quantity is preferably provided adjacent a refuelling port of the aircraft.

According to another aspect of the present invention there is provided a method of gauging the quantity of fluid in a tank comprising the steps of: computing the quantity of fluid from outputs of a first group of a plurality of gauging sensors, computing the quantity of fluid from outputs of a second group of gauging sensors different from the first group, and displaying two separate indications of fluid quantity derived from the different groups of sensors such that the two indications can be compared with one another.

According to a further aspect of the present invention there is provided a method of confirming delivery of the correct quantity of fuel to an aircraft comprising the steps of: computing the quantity of fuel from outputs of a first group of a plurality of fuel-gauging sensors, computing the quantity of fuel from outputs of a second group of fuel-gauging sensors different from the first group, and displaying for viewing externally of the aircraft two separate indications of fuel quantity derived from the different groups of sensors such that the two indications can be compared with one another to confirm delivery of the correct fuel quantity.

According to a fourth aspect of the present invention there is provided a system for use in performing a method according to the above other or further aspect of the present invention.

An aircraft fuel-gauging system according to the present invention will now be described, by way of example, with reference to the accompanying drawing.

BRIEF DESCRIPTION OF THE DRAWING

The drawing shows the system schematically.

DETAILED DESCRIPTION OF THE PREFERRED EMBODIMENT

The system includes two wing tanks 1 and 2 and a centre tank 3. The wing tanks 1 and 2 each include eight fuel height gauging probes or sensors 11 to 18 and 21 to 28 respectively, each of a conventional kind. The centre tank 3 has four sensors 31 to 34. A first group of odd-numbered sensors 11, 13, 15, 17, 21, 23, 25, 27, 31 and 33 are connected by wiring 5 to a first fuel-gauging computer or processor 7. A second group of even-numbered sensors 12, 14, 16, 18, 22, 24, 26, 28, 32 and 34 are connected by wiring 6 to a second fuel-gauging computer or processor 8, independent from the first processor 7. The processors 7 and 8 are each programmed to provide an output indication indicative of fuel quantity from a suitable fuel-gauging algorithm, pre-programmed with information about the shape of the tanks 1, 2 and 3 and from the height information from the sensors 11 to 18, 21 to 28 and 31 to 34 connected with the processors. The quantity information may be in the form of fuel volume or mass, which may require an input from a densitometer (not shown) or from two densitometers divided between the two different groups of height sensors. Other sensors, such as temperature sensors, may need to be divided between the two different groups.

The two processors 7 and 8 are interconnected with one another via a digital databus 40, which also connects with a cockpit display 41. The processors 7 and 8 are also connected to a refuel panel 42 mounted externally on the aircraft, typically adjacent a refuelling port 43 so as to be visible on the exterior of the aircraft to anyone refuelling the aircraft.

The system may operate in various different ways.

In one arrangement, the information from the two processors 7 and 8 is shared via the databus 40 during flight to provide the best possible indication of fuel quantity making use of information from all the sensors immersed in fuel. This information is displayed on the cockpit display 41. When the aircraft is on the ground and being refuelled, the two processors 7 and 8 provide two separate, nominally-identical display indications of fuel quantity to the refuel panel 42, derived from the two separate groups of sensors. These indications are not as accurate as those provided when the two processors 7 and 8 are interconnected, because of the reduced number of sensors used in each fuel quantity calculation. However, because the aircraft is static, on the ground, the attitude of the aircraft is such that a reduced number of sensors is sufficient for reasonable accuracy.

During the refuelling procedure it would be possible for the combined indication of fuel quantity derived from all the sensors to be supplied to the refuel panel 42 via a connection 44 so that three separate indications of fuel quantity are provided for comparison one against the other and against the flowmeter associated with the fuel dispenser.

In the event of a failure of the fuel-gauging system during flight, the system could be arranged to provide a reduced integrity fuel-quantity indication from either one of the gauging computers 7 or 8.

It can be seen that this arrangement provides a back-up fluid-quantity indication to be provided without the need for additional sensors. This enables the cost and weight of the fuel-gauging system to be kept to a minimum. The extra weight contributed by the additional processor is minimal. It may be necessary to position the sensors in the tanks such as to optimise the performance of each group of sensors. It will be appreciated that it is not essential to divide the sensors into just two groups since three or more groups, each with separate processors could be provided. The invention could be used in other fluid-gauging applications and is not confined to aircraft fuel-gauging systems.

What I claim is:

1. A fluid-gauging system comprising:
    at least one tank;
    a plurality of sensors associated with said at least one tank, each said sensor configured to provide an indication of a height of fluid at a location of a respective sensor, said plurality of sensors comprising a first group of sensors and a second group of sensors having sensors different than sensors of said first group of sensors; and
    a processor arrangement configured to provide a first indication of fluid quantity from said first group of sensors and a second indication of fluid quantity from said second group of sensors.

2. The fluid-gauging system according to claim 1, wherein said at least one tank further comprises a plurality of fluid tanks, wherein each tank comprises a gauging sensor of each said group of sensors.

3. The fluid-gauging system according to claim 1, wherein said processor arrangement comprises a first processor and a second processor separate from said first processor, wherein said first processor is arranged to provide said first indication of fluid quantity and said second processor is arranged to provide said second indication of fluid quantity.

4. The fluid-gauging system according to claim 3 further comprising an interconnection between said first processor and said second processor such that each said processor provides an indication separately or provides a combined indication derived from substantially all said sensors.

5. The fluid-gauging system according to claim 1, wherein said system is operable in a first mode and a second mode different from the first mode, wherein said system provides an indication of fluid quantity from a reduced number of said sensors in the first mode and provides an indication from substantially all said sensors in the second mode.

6. The fluid-gauging system according to claim 1, wherein said sensors comprise at least one of capacitive sensors and acoustic sensors.

7. A fuel-gauging system for an aircraft, said system comprising:
    at least one fuel tank;
    a plurality of gauging sensors associated with said at least one fuel tank, each said gauging sensor configured to provide an indication of a height of fuel at a location of a respective gauging sensor, said plurality of gauging sensors comprising a first group of sensors and a second group of sensors having sensors different than sensors of said first group of sensors; and
    a processor arrangement configured to provide a first indication of fuel quantity from said first group of sensors and a second indication of fuel quantity from said second group of sensors, wherein said first and second indications of fuel quantity are provided to a display of fuel quantity visible on an exterior of said aircraft.

8. The aircraft fuel-gauging system according to claim 7, wherein said display of fuel quantity is positioned adjacent a refuelling port of said aircraft.

9. The aircraft fuel-gauging system according to claim 7, wherein said display of fuel quantity is provided on a refuel panel.

10. The aircraft fuel-gauging system according to claim 7, wherein said at least one fuel tank comprises at least two fuel tanks, and wherein sensors of both said groups of sensors are located in each said fuel tank.

11. A method of gauging a quantity of fluid in a tank, said method comprising:
    computing a first quantity of fluid from outputs of a first group of a plurality of gauging sensors;
    computing a second quantity of fluid from outputs of a second group of gauging sensors different from the first group of gauging sensors;
    displaying two separate indications of fluid quantity derived from the different groups of sensors; and
    comparing the two indications of fluid quantity with each other.

12. A method of confirming delivery of a correct quantity of fuel to an aircraft, said method comprising:
    computing a first quantity of fuel from outputs of a first group of a plurality of fuel-gauging sensors;
    computing a second quantity of fuel from outputs of a second group of fuel-gauging sensors different from the first group of gauging sensors;
    displaying for viewing externally of the aircraft two separate indications of fuel quantity derived from the different groups of sensors; and
    comparing the two indications of fuel quantity with each other to confirm delivery of the correct fuel quantity.

* * * * *